(12) United States Patent
Boday et al.

(10) Patent No.: US 9,355,652 B2
(45) Date of Patent: May 31, 2016

(54) REDUCED FRICTION RETENTION OF A DATA STORAGE CARTRIDGE WITHIN A STORAGE CELL

(75) Inventors: Dylan J. Boday, Tucson, AZ (US);
Andrew S. Green, Tucson, AZ (US);
Shawn M. Nave, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 268 days.

(21) Appl. No.: 13/606,666

(22) Filed: Sep. 7, 2012

(65) Prior Publication Data

US 2014/0071609 A1  Mar. 13, 2014

(51) Int. Cl.
*G06F 1/16* (2006.01)
*G11B 5/008* (2006.01)
(Continued)

(52) U.S. Cl.
CPC .............. *G11B 5/00813* (2013.01); *G11B 5/78* (2013.01); *G11B 33/04* (2013.01); *G11B 33/124* (2013.01); *G11B 33/128* (2013.01)

(58) Field of Classification Search
CPC .................. G06F 1/16–1/1654; G06F 1/1656; G06F 1/1662–1/1681; G06F 1/1684–1/189; G06F 1/20; G06F 1/203; G06F 1/206; G06F 2200/201; G06F 2200/202–2200/203; H05K 5/0026; H05K 5/0082; H05K 5/0021; H05K 5/0086–5/06; H05K 7/005–7/08; H05K 7/20; H05K 7/1422; H05K 1/0218–1/0219; H05K 1/00; H05K 3/00; H05K 9/00; H05K 7/20218–7/20381; H05K 7/20409–7/20418; H05K 7/20009–7/202; H05K 5/00–5/069; H05K 7/00–7/186; H01G 2/00; H01G 4/00; H01G 5/00; H01G 7/00; H01G 9/00–9/155; H01G 11/00; H02G 3/00; H02G 5/00; H02G 7/00; H02G 9/00; H02G 11/00; H02G 13/00; H02G 15/00; H01B 7/00; H01B 11/00; H01B 17/00; H01B 4/00; H01R 9/00; H01R 13/00; H01K 1/00; H01K 3/00; H02B 1/00; H01H 37/00; H01L 23/367–23/3677; H01L 23/473; H01L 23/46–23/467
USPC ......... 360/97.11, 98.01, 137; 312/332.1, 333, 312/223.1–223.3; 248/618, 633–638, 248/633–336; 369/75.11, 75.21, 76, 77.11, 369/77.21, 78–82; 267/136–141; 174/544; 206/701; 211/26, 187, 190; 720/601–652; 361/679.33–679.39, 361/679.31–679.39, 679.01–679.45, 361/679.55–679.61, 724–727, 361/679.26–679.3, 756, 741, 686, 687, 688, 361/696, 697, 787, 789, 794, 701–703, 709, 361/807–810; 455/575.1–575.9; 349/56–60

See application file for complete search history.

(56) References Cited

U.S. PATENT DOCUMENTS 1,534,259 A   4/1925  Dempsey et al.
1,570,177 A   1/1926  Pointer et al.
(Continued)

OTHER PUBLICATIONS

D.J. Boday, A.S. Green, S.M. Nave; 'Texturing of a Storage Cell for Reduced Friction Retention of a Data Storage Cartridge'; IBM Corporation; pp. 1-25 (includes 8 Pages. of Figures).
(Continued)

*Primary Examiner* — Anthony Haughton
*Assistant Examiner* — Razmeen Gafur
(74) *Attorney, Agent, or Firm* — Zilka-Kotab, PC

(57) ABSTRACT

Described are embodiments of an invention for a textured interface between a notch of a data storage cartridge and a retention tab of a storage cell. The textured surface reduces the contact surface between the retention tab and the notch of the data storage cartridge. The reduced contact surface between the retention tab and notch of the data storage cartridge reduces the amount of friction between the retention tab and the notch of the data storage cartridge. The data storage cartridge can thus be removed from the storage cell with less force than that required by the prior art having a generally smooth interface between the notch of the data storage cartridge and the retention tab of the storage cell.

25 Claims, 7 Drawing Sheets

(51) Int. Cl.
  *G11B 33/12* (2006.01)
  *G11B 5/78* (2006.01)
  *G11B 33/04* (2006.01)
  *H05K 5/00* (2006.01)
  *H05K 7/00* (2006.01)

(56) References Cited

U.S. PATENT DOCUMENTS

| | | | |
|---|---|---|---|
| 1,931,498 A | 10/1933 | Kattrein et al. | |
| 2,469,586 A | 5/1949 | Wallace et al. | |
| 2,816,351 A | 12/1957 | Sauers et al. | |
| 3,141,270 A | 7/1964 | Marcel et al. | |
| RE26,039 E | 6/1966 | Johnson | |
| 4,263,692 A | 4/1981 | Gremillion | |
| 4,333,214 A | 6/1982 | Neumann et al. | |
| 4,845,901 A | 7/1989 | Hamlin | |
| 4,951,425 A | 8/1990 | Naghi | |
| 4,993,100 A | 2/1991 | Halboth et al. | |
| 5,025,526 A | 6/1991 | Ichitsubo et al. | |
| 5,058,327 A | 10/1991 | Buchanan | |
| 5,177,906 A | 1/1993 | Balding et al. | |
| 5,241,793 A | 9/1993 | Armato | |
| 5,483,419 A * | 1/1996 | Kaczeus, Sr. | G06F 13/4081 312/274 |
| 5,532,888 A | 7/1996 | Acosta et al. | |
| 5,828,547 A | 10/1998 | Francovich et al. | |
| 5,926,341 A | 7/1999 | Mueller et al. | |
| 6,017,267 A | 1/2000 | Ariza et al. | |
| 6,166,908 A * | 12/2000 | Samaras | H05K 7/20336 165/104.33 |
| 6,187,106 B1 | 2/2001 | Backlund et al. | |
| 6,252,765 B1 * | 6/2001 | Balzaretti et al. | 361/679.42 |
| 6,259,578 B1 | 7/2001 | Christiansen et al. | |
| 6,324,062 B1 | 11/2001 | Treiber et al. | |
| 6,381,130 B1 * | 4/2002 | Yen | G11B 33/128 361/679.33 |
| 6,381,148 B1 * | 4/2002 | Daskalakis et al. | 361/801 |
| 6,385,040 B2 * | 5/2002 | Nabetani | G06K 7/0082 361/679.31 |
| 6,456,501 B1 * | 9/2002 | Rubenstein et al. | 361/759 |
| 6,483,107 B1 * | 11/2002 | Rabinovitz | G06F 1/181 250/239 |
| 6,631,863 B2 * | 10/2003 | Nawa | 242/338.1 |
| 6,661,747 B2 | 12/2003 | Mueller et al. | |
| 6,683,785 B1 * | 1/2004 | Chen | G11B 33/124 312/332.1 |
| 6,776,345 B1 | 8/2004 | Liang | |
| 6,819,525 B2 | 11/2004 | Brace et al. | |
| 6,912,132 B2 * | 6/2005 | Riddiford | G06F 1/183 211/41.17 |
| 7,102,885 B2 | 9/2006 | Chen et al. | |
| 7,322,841 B1 * | 1/2008 | Chuang et al. | 439/160 |
| 7,417,866 B1 * | 8/2008 | Beseth | H05K 7/1409 361/728 |
| 7,486,473 B2 | 2/2009 | Thorson et al. | |
| 7,580,220 B1 * | 8/2009 | Grow | G11B 33/0438 360/92.1 |
| 7,796,377 B2 | 9/2010 | Carney et al. | |
| 7,843,663 B2 | 11/2010 | Nave et al. | |
| 8,023,259 B2 | 9/2011 | Lam et al. | |
| 8,054,636 B2 | 11/2011 | Fan et al. | |
| 8,081,488 B2 * | 12/2011 | Kondo | H04N 5/2251 361/679.01 |
| 8,264,833 B2 | 9/2012 | Fang et al. | |
| 8,379,343 B2 | 2/2013 | Cheng et al. | |
| 8,462,495 B1 * | 6/2013 | Keefe et al. | 361/679.46 |
| 8,508,930 B2 * | 8/2013 | Peng et al. | 361/679.33 |
| 8,608,072 B2 | 12/2013 | Jeong et al. | |
| 8,636,432 B2 | 1/2014 | Kosuge | |
| 8,677,381 B2 | 3/2014 | Kawakami | |
| 9,039,486 B2 | 5/2015 | Boday et al. | |
| 2002/0006030 A1 * | 1/2002 | Evanson | G11B 15/6825 361/724 |
| 2002/0056778 A1 * | 5/2002 | Nawa | G11B 15/22 242/338.1 |
| 2002/0109967 A1 | 8/2002 | Nabetani et al. | |
| 2002/0118529 A1 | 8/2002 | Babin et al. | |
| 2003/0090182 A1 | 5/2003 | Johnson | |
| 2003/0128527 A1 * | 7/2003 | Chewning | H05K 7/1414 361/747 |
| 2004/0074082 A1 * | 4/2004 | Kim | G06F 1/184 29/603.03 |
| 2005/0117288 A1 * | 6/2005 | Spychalla | G06F 1/181 361/679.33 |
| 2005/0221742 A1 | 10/2005 | Su | |
| 2007/0162915 A1 * | 7/2007 | Hong et al. | 720/601 |
| 2007/0211422 A1 * | 9/2007 | Liu et al. | 361/685 |
| 2007/0230107 A1 * | 10/2007 | Hsu | G11B 33/124 361/679.37 |
| 2008/0036338 A1 * | 2/2008 | Liang | E05C 3/047 312/223.2 |
| 2008/0089022 A1 * | 4/2008 | Cheung | G06F 1/187 361/679.37 |
| 2008/0101008 A1 * | 5/2008 | Ulrich | G11B 33/08 361/679.37 |
| 2008/0192381 A1 * | 8/2008 | Minemura | G11B 15/6885 360/137 |
| 2008/0231988 A1 * | 9/2008 | Nave et al. | 360/92.1 |
| 2008/0303393 A1 | 12/2008 | Krinsly | |
| 2010/0039773 A1 * | 2/2010 | Tilton | H01L 23/427 361/699 |
| 2010/0053880 A1 * | 3/2010 | Jesionowski | G11B 15/689 361/679.32 |
| 2010/0187957 A1 * | 7/2010 | Liang | G06F 1/187 312/223.2 |
| 2010/0218203 A1 * | 8/2010 | Kusumi | 720/601 |
| 2010/0246109 A1 * | 9/2010 | Matsubara | G03G 21/1633 361/679.01 |
| 2011/0090639 A1 * | 4/2011 | Li | 361/679.39 |
| 2011/0119691 A1 * | 5/2011 | Goto et al. | 720/601 |
| 2011/0132851 A1 * | 6/2011 | Christie, Jr. | G11B 17/041 211/26 |
| 2011/0188195 A1 * | 8/2011 | Scherf-Smith et al. | 361/679.37 |
| 2012/0327595 A1 | 12/2012 | Caldwell et al. | |
| 2013/0080713 A1 | 3/2013 | Steinhilber | |
| 2014/0069250 A1 | 3/2014 | Boday et al. | |
| 2016/0012830 A1 | 1/2016 | Boday et al. | |

OTHER PUBLICATIONS

Boday et al., U.S. Appl. No. 14/862,659, filed Sep. 23, 2015.
Non-Final Office Action from U.S. Appl. No. 13/606,812, dated Jun. 30, 2014.
Notice of Allowance from U.S. Appl. No. 13/606,812, dated Oct. 27, 2014.
Notice of Allowance from U.S. Appl. No. 13/606,812, dated Jan. 21, 2015.
Non-Final Office Action from U.S Appl. No. 14/862,659, dated Dec. 3, 2015.
Notice of Allowance from U.S. Appl. No. 14/862,659, dated Apr. 6, 2016.

* cited by examiner

REDUCED FRICTION RETENTION OF A DATA STORAGE CARTRIDGE WITHIN A STORAGE CELL

TECHNICAL FIELD

This disclosure relates to the retention of data storage cartridges within a storage cell.

BACKGROUND

Automated data storage libraries are known for providing cost effective storage and retrieval of large quantities of data. The data in automated data storage libraries is stored on data storage media that are, in turn, stored on storage cells or the like inside the library in a fashion that renders the media, and its resident data, accessible for physical retrieval. Such media is commonly termed "removable media." Data storage media may comprise any type of media on which data may be stored and which may serve as removable media, including but not limited to magnetic media (such as magnetic tape or disks), optical media (such as optical tape or disks), electronic media (such as PROM, EEPROM, flash PROM, MRAM, Compactflash®, Smartmedia®, Memory Stick®, etc.), or other suitable media. Typically, the data stored in automated data storage libraries is resident on data storage media that is contained within a cartridge and referred to as a data storage cartridge. An example of a data storage cartridge that is widely employed in automated data storage libraries for mass data storage is a magnetic tape cartridge.

SUMMARY OF THE INVENTION

Described are embodiments of an invention for a textured interface between a notch of a data storage cartridge and a retention tab of a storage cell to provide a consistent and low friction force that retains the data storage cartridge within the cell but allows the accessor to easily remove the data storage cartridge when needed. The textured surface reduces the contact surface between the retention tab and the notch of the data storage cartridge. Accordingly, the reduced contact surface between the retention tab and notch of reduces the amount of friction between the retention tab and the notch. The data storage cartridge can thus be removed from the storage cell with less force than that required by the prior art which has a generally smooth interface between the notch of the data storage cartridge and the retention tab of the storage cell. Further, the textured surface allows for a more consistent amount of friction between the notch and retention tab for each data storage cartridge and its respective storage cell such that a consistent amount of force can be applied by the accessor to remove each data storage cartridge from their respective storage cells.

For example, one embodiment includes a storage cell having housing for storing a data storage cartridge. The storage cell includes an opening in the housing for a inserting and removing a data storage cartridge. The storage cell further includes a textured retention tab within the housing for engaging with a notch of the data storage cartridge for retaining the data storage cartridge with the housing.

In one embodiment, the storage cell housing further includes a pair of opposing sidewalls, a back wall, and a floor that is orthogonal and connected to the opposing side walls and back wall. The side walls, back wall and floor define the opening for inserting and removing the data storage cartridge. The retention tab of the storage cell protrudes from at least one of the side walls of the housing and depresses out of the path of the data storage cartridge when the data storage cartridge is inserted with the housing and engages with the notch of the data storage cartridge. In one of the embodiments, the retention tab has at least one textured surface that contacts the notch on the side wall of the data storage cartridge when the data storage cartridge is inserted into the storage cell. The texture of the retention tab includes at least one of bumps, lines and grooves. The texture of the retention tab reduces the contact surface between the retention tab and the notch. The reduced contact surface between the retention tab and the notch reduces the amount of force necessary for removing the data storage cartridge from the storage cell.

In another embodiment, the storage cell includes a housing having a pair of opposing side walls, a back wall and a floor. The floor is orthogonal and connected to the opposing side walls and the back wall. The side walls, the back wall and the floor define an opening for inserting and removing a data storage cartridge. The storage cell also includes a retention tab protruding from at least one sidewall for releasable engaging with a notch on a side wall of a data storage cartridge and for retaining the data storage cartridge within the opening when the data storage cartridge is inserted into the storage cell. The retention tab has at least one textured surface that contacts the notch on the side wall of the data storage cartridge when the data storage cartridge is inserted into the storage cell.

In one embodiment, a data storage cartridge includes a cartridge housing having a notch on at least one side. The notch includes at least one textured surface. The notch engages with a retention tab that protrudes from a side wall of the storage cell for retaining the data storage cartridge within the storage cell when the data storage cartridge is inserted in the storage cell.

The cartridge housing may include a top, bottom, front, back, and two sides. In one embodiment, the at least one textured surface of the notch contacts the retention tab when the data storage cartridge is inserted into the storage cell. The texture of the notch includes at least one of bumps, lines and grooves. The texture of the notch reduces the contact surface between the retention tab and the notch. The reduced contact surface between the retention tab and the notch reduces the amount of force necessary for removing the data storage cartridge from the storage cell. In one embodiment, the data storage cartridge is a tape cartridge.

In another embodiment, the data storage cartridge includes a cartridge housing including a top, bottom, front, back, and two sides. The data storage cartridge further includes a notch on at least one side of the data storage cartridge for retaining the data storage cartridge within the storage cell. The storage cell may include a pair of opposing side walls, a back wall, a floor and an opening for inserting and removing the data storage cartridge. The notch engages with a retention tab protruding from a side wall of the storage cell when the data storage cartridge is inserted in the storage cell. The notch includes at least one textured surface that contacts the retention tab when the data storage cartridge is inserted into the storage cell.

Finally, in one embodiment, an automated data storage library for data storage cartridges includes an array of storage cells for storing the data storage cartridges and each storage cell includes a housing having a pair of opposing side walls, a back wall and a floor. The floor is orthogonal and connected to the opposing side walls and the back wall. The side walls, the back wall and the floor define an opening for inserting and removing a data storage cartridge. Each storage cell also includes a retention tab protruding from at least one sidewall for releasable engaging with a notch on a side wall of a data storage cartridge and for retaining the data storage cartridge within the opening when the data storage cartridge is inserted into the storage cell. The retention tab has at least one textured surface that contacts the notch on the side wall of the data storage cartridge when the data storage cartridge is inserted into the storage cell. The automated data storage library, may also include in one embodiment, an accessor for transporting the data storage cartridge with the automated data storage library, and the textured surface of the retention tab reduces the amount of force necessary for the accessor to remove the data storage cartridge from the storage cell.

BRIEF DESCRIPTION OF THE DRAWINGS

Embodiments of the present invention are understood by referring to the figures in the attached drawings, as provided below.

DETAILED DESCRIPTION OF THE PREFERRED EMBODIMENT

Figure 1:
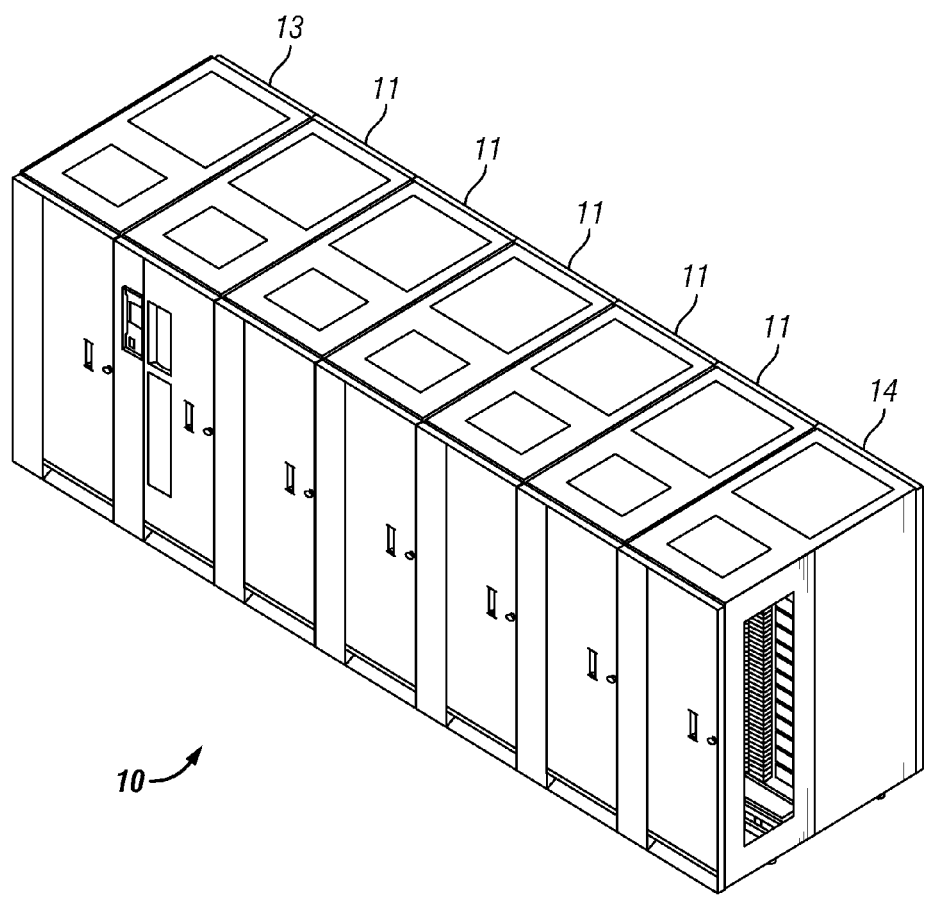
FIG. 1 illustrates automated data storage library with the view specifically depicting a library having a left hand service bay, multiple storage frames and a right hand service bay in accordance with an embodiment of the invention.

Automated data storage libraries include one or more accessors to move data storage cartridges between storage cells and to data storage drives. The storage cells must retain the data storage cartridges such that outside influences such as normal machine or door opening or closing operations etc. do not cause the data storage cartridges to move out of the storage cells. However, the retention force of the storage cell must still be easily overcome by an accessor removing or adding cartridges to the storage cell. Retention tabs in a storage cell may be used to engage with a notch in a data storage cartridge to retain the data storage cartridge in the slot. The notch of the data storage cartridge, and the data storage cartridge itself, have generally smooth surfaces. Similarly, the retention tab of the storage cell, and the storage cell itself, have generally smooth surfaces. The smooth surface of the notch of the data storage cartridge comes into contact with the smooth surface of the retention tab of the storage cell and the data storage cartridge is retained in the storage cell by a certain amount of friction. However, in some cases, the amount of friction between the retention tab and notch is too high such that the accessor is not able to remove the data storage cartridge from the storage cell. Further, the amount of friction between the retention tab and notch is not consistent for each data storage cartridge and its respective storage cell, such that accessor may be able to remove some data storage cartridges from their respective storage cells, but not be able to remove others. These issues may result in the accessor being unable to remove one or more data storage cartridges from their respective storage cells causing undesired downtime for the automated data storage library.

Described are embodiments of an invention for a textured interface between a notch of a data storage cartridge and a retention tab of a storage cell to provide a consistent and low friction force that retains the data storage cartridge within the cell but allows the accessor to easily remove the data storage cartridge when needed. In one embodiment, the retention tab of a storage cell includes at least one textured surface. In another embodiment, the notch on a data storage cartridge includes at least one textured surface.

The storage cell includes a housing for storing a data storage cartridge and includes an opening for inserting and removing a data storage cartridge. A retention tab within the housing engages with the notch of the data storage cartridge to retain the data storage cartridge with the housing. In one embodiment, the retention tab of a storage cell includes at least one textured surface. In another embodiment, the notch on a data storage cartridge includes at least one textured surface. The textured surface reduces the contact surface between the retention tab and the notch of the data storage cartridge. Accordingly, the reduced contact surface between the retention tab and notch reduces the amount of friction between the retention tab and the notch. The data storage cartridge can thus be removed from the storage cell with less force than that required by the prior art having a generally smooth interface between the notch of the data storage cartridge and the retention tab of the storage cell Further, the textured surface allows for a more consistent amount of friction between the notch and retention tab for each data storage cartridge and its respective storage cell. This consistent amount of friction between the notch and retention tab allows for the amount force required to move one data storage cartridge from its respective storage cell to be close to the amount of force required to move another data storage cartridge from its respective storage cell. Thus, a consistent amount of force can be applied by the accessor to remove each data storage cartridge from their respective storage cells. Thus, the textured interface between notch of the data storage cartridge and the retention tab allows for a low and consistent force to remove a plurality of data storage cartridges from their respective storage cells.

It will be obvious, however, to one skilled in the art, that embodiments of the present invention may be practiced without some or all of these specific details. In other instances, well known process operations have not been described in detail to prevent obscuring the embodiments of the present invention described herein.

It is understood that all surfaces have a certain amount of texture. Therefore, for purposes of the description herein, a textured surface is a surface that has more texture than an immediate surrounding area. For example, in the embodiment in which the retention tab of a storage cell has a textured surface, the retention tab is said to have a textured surface when the textured surface has more texture than that of the immediate surrounding area (e.g. the sidewall of the storage cell if the retention tab is provided on a sidewall of the storage cell) Similarly, in the embodiment in which the notch of the data storage cartridge has a textured surface, the notch is said to have a textured surface when the textured surface of the notch has more texture than that of the immediate surrounding area (e.g. the sidewall of the data storage cartridge if the notch is provided on the sidewall of the data storage cartridge). Accordingly, a non-textured surface or a smooth surface is defined herein as a surface that has the same amount of texture or less texture than an immediate surrounding area.

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention. The invention will be described as embodied in an automated data storage library for use in a data processing environment. Although the invention shown used magnetic tape cartridges, one skilled in the art would recognize that the invention equally applies to optical disk cartridges or other removable storage media.

Figure 2:
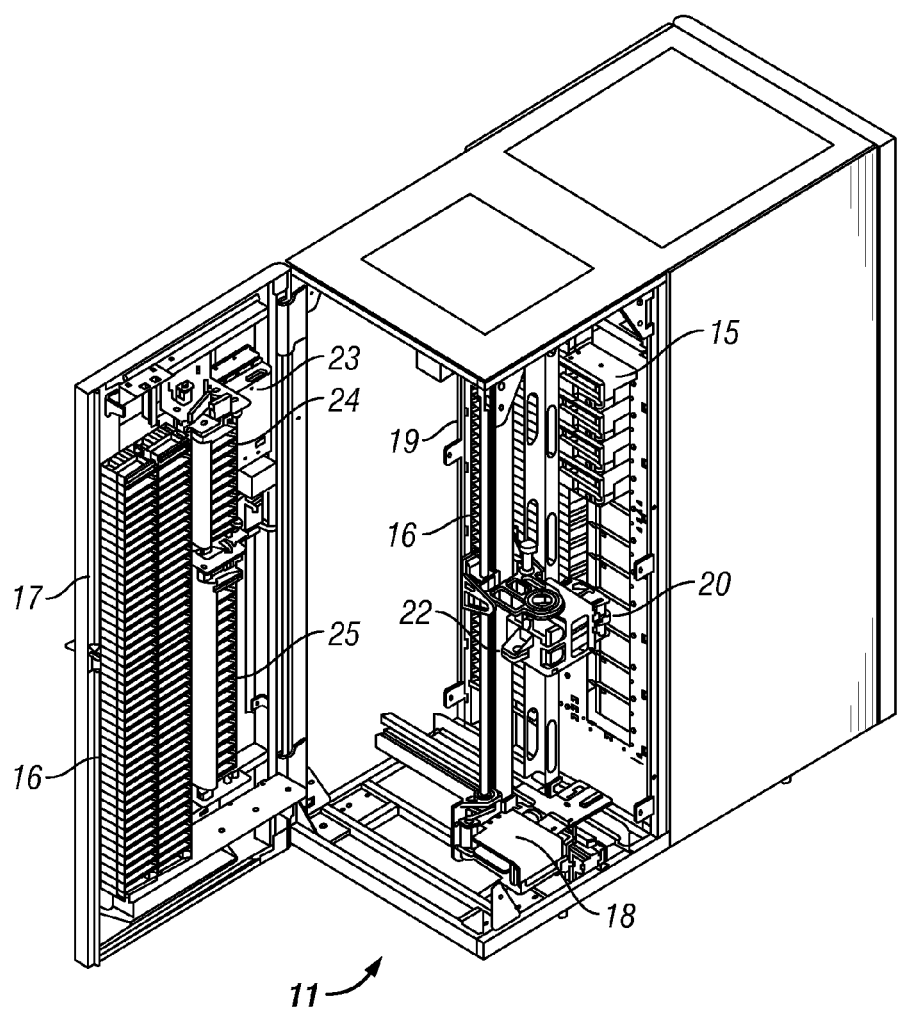
FIG. 2 illustrates an automated data storage library with the view specifically depicting an exemplary basic configuration of the internal components of a library in accordance with an embodiment of the invention.

Turning now to the Figures, FIGS. 1 and 2 illustrate an automated data storage library 10 which stores and retrieves data storage cartridges containing data storage media (not shown) in storage cells 16. It is noted that references to "data storage media" herein refer to data storage cartridges, and for purposes herein the two terms may be used synonymously. An example of an automated data storage library which may be used in the described embodiments is the IBM® 3584 UltraScalable Tape Library, and has a configuration as depicted in FIGS. 1 and 2. The library of FIG. 1 comprises a left hand service bay 13, one or more storage frames 11, and right hand service bay 14. As will be discussed, a frame may comprise an expansion component of the library. Frames may be added or removed to expand or reduce the size and/or functionality of the library. Frames may comprise additional storage cells, drives, import/export stations, accessors, operator panels, etc.

FIG. 2 shows an example of a storage frame 11, which is the base frame of the library 10 and is contemplated to be the minimum configuration of the library. In this minimum configuration, there is only a single accessor (i.e., there are no redundant accessors) and there is no service bay. The library 10 is arranged for accessing data storage media in response to commands from at least one external host system (not shown), and comprises a plurality of storage cells 16, on front wall 17 and rear wall 19 for storing data storage cartridges that contain data storage media; at least one data storage drive 15 for reading and/or writing data with respect to the data storage media; and a first accessor 18 for transporting the data storage media between the plurality of storage cells 16 and the data storage drive(s) 15. The data storage drives 15 may be optical disk drives or magnetic tape drives, or other types of data storage drives as are used to read and/or write data with respect to the data storage media. The storage frame 11 may optionally comprise an operator panel 23 or other user interface, such as a web-based interface, which allows a user to interact with the library. The storage frame 11 may optionally comprise an upper I/O station 24 and/or a lower I/O station 25, which allows data storage media to be inserted into the library and/or removed from the library without disrupting library operation. The library 10 may comprise one or more storage frames 11, each having storage cells 16 accessible by first accessor 18.

As described above, the storage frames 11 may be configured with different components depending upon the intended function. One configuration of storage frame 11 may comprise storage cells 16, data storage drive(s) 15, and other optional components to store and retrieve data from the data storage cartridges. The first accessor 18 comprises a gripper assembly 20 for gripping one or more data storage media and may include a bar code scanner 22 or other reading system, such as a cartridge memory reader or similar system, mounted on the gripper 20, to "read" identifying information about the data storage media.

Figure 3:
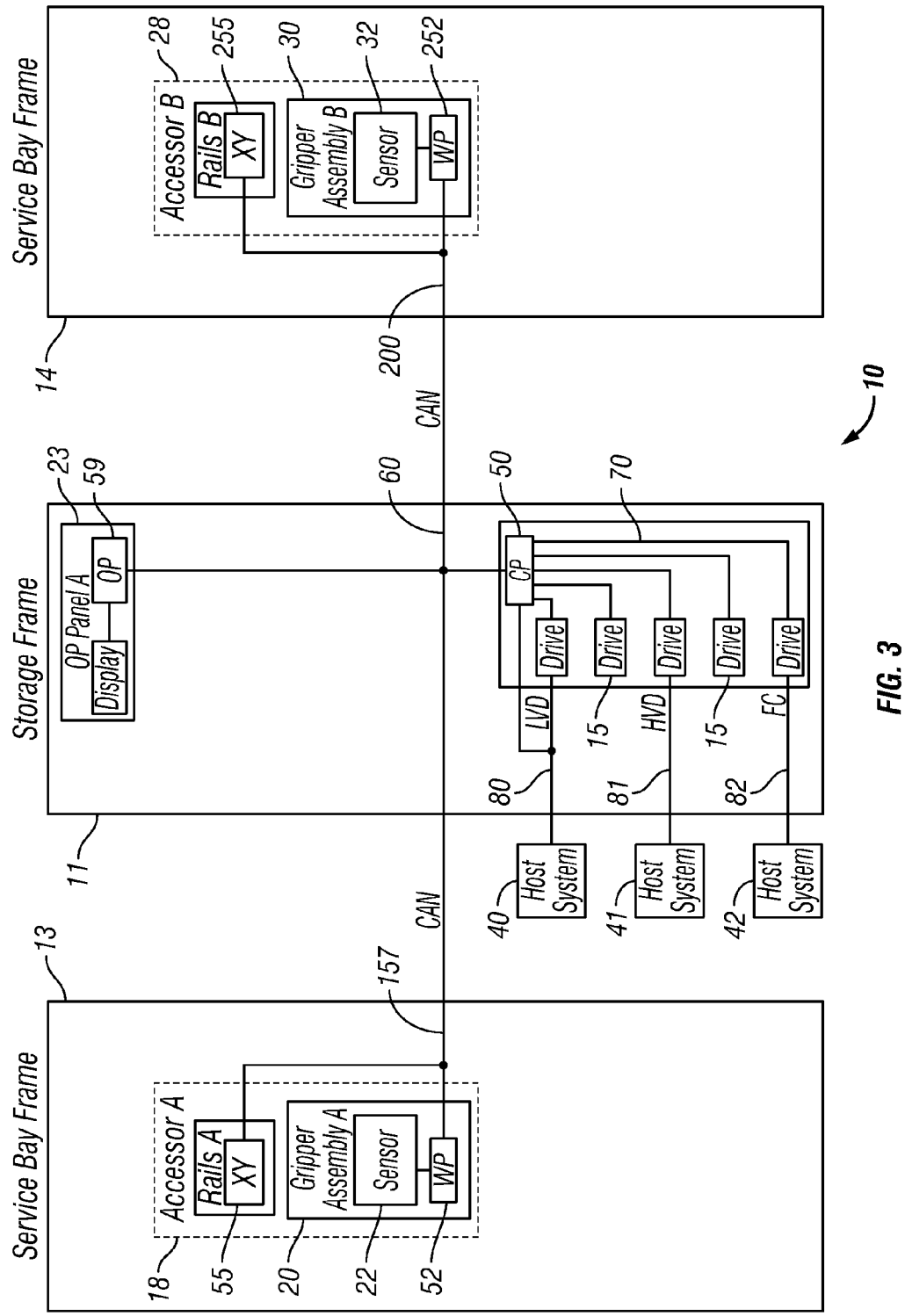
FIG. 3 is a block diagram of an automated data storage library with the diagram specifically depicting a library that employs a distributed system of modules with a plurality of processor nodes in accordance with an embodiment of the invention.

FIG. 3 illustrates an embodiment of an automated data storage library 10 of FIGS. 1 and 2, which employs a distributed system of modules with a plurality of processor nodes. An example of an automated data storage library which may implement the distributed system depicted in the block diagram of FIG. 3, and which may implement the described embodiments, is the IBM 3584 UltraScalable Tape Library.

While the automated data storage library 10 has been described as employing a distributed control system, the described embodiments may be implemented in automated data storage libraries regardless of control configuration, such as, but not limited to, an automated data storage library having one or more library controllers that are not distributed. The library of FIG. 3 comprises one or more storage frames 11, a left hand service bay 13 and a right hand service bay 14. The left hand service bay 13 is shown with a first accessor 18. As discussed above, the first accessor 18 comprises a gripper assembly 20 and may include a reading system 22 to "read" identifying information about the data storage media. The right hand service bay 14 is shown with a second accessor 28. The second accessor 28 comprises a gripper assembly 30 and may include a reading system 32 to "read" identifying information about the data storage media. In the event of a failure or other unavailability of the first accessor 18, or its gripper 20, etc., the second accessor 28 may perform some or all of the functions of the first accessor 18. The two accessors 18, 28 may share one or more mechanical paths or they may comprise completely independent mechanical paths. In one example, the accessors 18, 28 may have a common horizontal rail with independent vertical rails. The first accessor 18 and the second accessor 28 are described as first and second for descriptive purposes only and this description is not meant to limit either accessor to an association with either the left hand service bay 13, or the right hand service bay 14.

In the exemplary library, first accessor 18 and second accessor 28 move their grippers in at least two directions, called the horizontal "X" direction and vertical "Y" direction, to retrieve and grip, or to deliver and release the data storage media at the storage cells 16 and to load and unload the data storage media at the data storage drives 15.

The exemplary library 10 receives commands from one or more host systems 40, 41 or 42. The host systems, such as host servers, communicate with the library directly, e.g., on path 80, through one or more control ports (not shown), or through one or more data storage drives 15 on paths 81, 82, providing commands to access particular data storage media and move the media, for example, between the storage cells 16 and the data storage drives 15. The commands are typically logical commands identifying the media and/or logical locations for accessing the media. The terms "commands" and "work requests" are used interchangeably herein to refer to such communications from the host system 40, 41 or 42 to the library 10 as are intended to result in accessing particular data storage media within the library 10.

The exemplary library is controlled by a distributed control system receiving the logical commands from hosts, determining the required actions, and converting the actions to physical movements of first accessor 18 and/or second accessor 28.

In the exemplary library, the distributed control system comprises a plurality of processor nodes, each having one or more processors. In one example of a distributed control system, a communication processor node 50 may be located in a storage frame 11. The communication processor node provides a communication link for receiving the host commands, either directly or through the drives 15, via at least one external interface, e.g., coupled to line 80.

The communication processor node 50 may additionally provide a communication link 70 for communicating with the data storage drives 15. The communication processor node 50 may be located in the frame 11, close to the data storage drives 15. Additionally, in an example of a distributed processor system, one or more additional work processor nodes 52, 252 are provided, which may comprise, e.g., a work processor node 52 that may be located at first accessor 18, and that is coupled to the communication processor node 50 via a network 60, 157. Each work processor node may respond to received commands that are broadcast to the work processor nodes from any communication processor node, and the work processor nodes may also direct the operation of the accessors, providing move commands. One or more XY processor nodes 55, 255 are provided, which may comprise, e.g., an XY processor node 55 located at an XY system of first accessor 18. The XY processor node 55 is coupled to the network 60, 157, and is responsive to the move commands, operating the XY system to position the gripper 20.

Also, an operator panel processor node 59 may be provided at the optional operator panel 23 for providing an interface for communicating between the operator panel and the communication processor node 50, the work processor nodes 52, 252, and the XY processor nodes 55, 255.

A network, for example comprising a common bus 60, is provided, coupling the various processor nodes. The network may comprise a robust wiring network, such as the commercially available CAN (Controller Area Network) bus system, which is a multi-drop network, having a standard access protocol and wiring standards, for example, as defined by CiA, the CAN in Automation Association, Am Weich Selgarten 26, D-91058 Erlangen, Germany. Other networks, such as Ethernet, or a wireless network system, such as RF or infrared, may be employed in the library as is known to those of skill in the art. In addition, multiple independent networks may also be used to couple the various processor nodes.

The communication processor node 50 is coupled to each of the data storage drives 15 of a storage frame 11, via lines 70, communicating with the drives and with host systems 40, 41 and 42. Alternatively, the host systems may be directly coupled to the communication processor node 50, at input 80 for example, or to control port devices (not shown) which connect the library to the host system(s) with a library interface similar to the library/drive interface. As is known to those of skill in the art, various communication arrangements may be employed for communication with the hosts and with the data storage drives 15. In the example of FIG. 3, host connections 80 and 81 are SCSI busses. Bus 82 comprises an example of a Fibre Channel bus which is a high speed serial data interface, allowing transmission over greater distances than the SCSI bus systems.

The data storage drives 15 may be in close proximity to the communication processor node 50, and may employ a short distance communication scheme, such as SCSI, RS-422, USB (Universal Serial Bus), SAS (Serial Attached SCSI), etc. The data storage drives 15 are thus individually coupled to the communication processor node 50 by means of lines 70. Alternatively, the data storage drives 15 may be coupled to the communication processor node 50 through one or more networks, such as CAN, Ethernet, etc.

Additional storage frames 11 may be provided and each is coupled to the adjacent storage frame. Any of the storage frames 11 may comprise communication processor nodes 50, storage cells 16, data storage drives 15, and networks 60.

Further, as described above, the automated data storage library 10 may comprise a plurality of accessors. A second accessor 28, for example, is shown in a right hand service bay 14 of FIG. 3. The second accessor 28 may comprise a gripper 30 for accessing the data storage media, and an XY system 255 for moving the second accessor 28. The second accessor 28 may run on the same horizontal mechanical path as first accessor 18, or on an adjacent path. The exemplary control system additionally comprises an extension network 200 forming a network coupled to network 60 of the storage frame(s) 11 and to the network 157 of left hand service bay 13.

In FIG. 3 and the accompanying description, the first and second accessors are associated with the left hand service bay 13 and the right hand service bay 14 respectively. This is for illustrative purposes and there may not be an actual association. In addition, network 157 may not be associated with the left hand service bay 13 and network 200 may not be associated with the right hand service bay 14. Depending on the design of the library, it may not be necessary to have a left hand service bay 13 and/or a right hand service bay 14.

Figure 4:
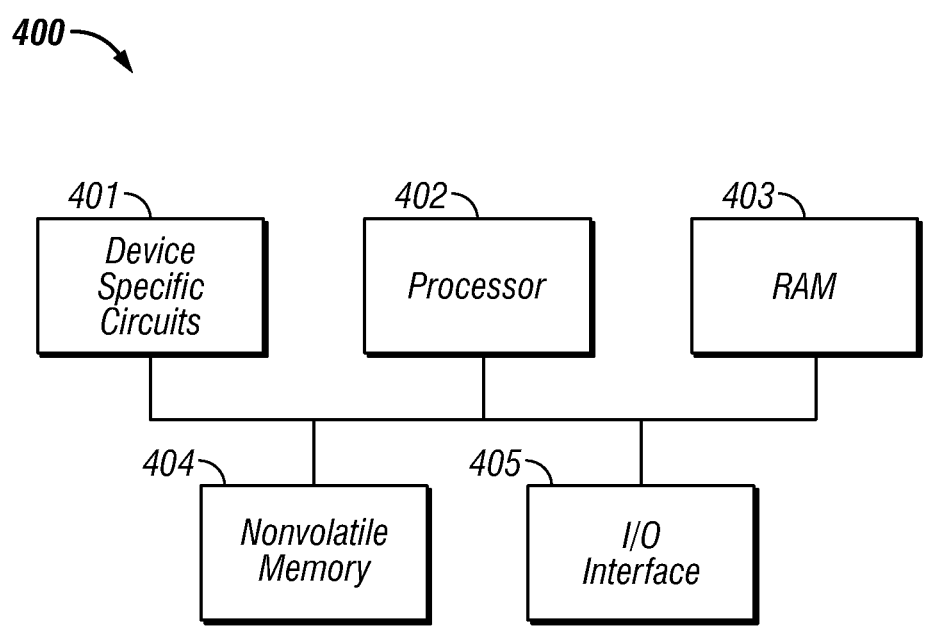
FIG. 4 is a block diagram depicting an exemplary controller configuration in accordance with an embodiment of the invention.

An automated data storage library 10 typically comprises one or more controllers to direct the operation of the automated data storage library. Host computers and data storage drives typically comprise similar controllers. A controller may take many different forms and may comprise, for example but not limited to, an embedded system, a distributed control system, a personal computer, or a workstation. Essentially, the term "controller" as used herein is intended in its broadest sense as a device that contains at least one processor, as such term is defined herein. FIG. 4 shows a typical controller 400 with a processor 402, RAM (Random Access Memory) 403, nonvolatile memory 404, device specific circuits 401, and I/O interface 405. Alternatively, the RAM 403 and/or nonvolatile memory 404 may be contained in the processor 402 as could the device specific circuits 401 and I/O interface 405. The processor 402 may comprise, for example, an off-the-shelf microprocessor, custom processor, FPGA (Field Programmable Gate Array), ASIC (Application Specific Integrated Circuit), discrete logic, or the like. The RAM (Random Access Memory) 403 is typically used to hold variable data, stack data, executable instructions, and the like. The nonvolatile memory 404 may comprise any type of nonvolatile memory such as, but not limited to, ROM (Read Only Memory), PROM (Programmable Read Only Memory), EEPROM (Electrically Erasable Programmable Read Only Memory), flash PROM (Programmable Read Only Memory), NVRAM (Non-Volatile Random Access Memory), MRAM (Magnetoresistive Random Access Memory), battery backup RAM, CompactFlash®, SD (Secure Digital), CD (Compact Disk), DVD (Digital Versatile Disk), hard disk drives, etc. The nonvolatile memory 404 is typically used to hold the executable firmware and any nonvolatile data. The I/O interface 405 comprises a communication interface that allows the processor 402 to communicate with devices external to the controller 400. Examples may comprise, but are not limited to, serial interfaces such as RS-232, USB (Universal Serial Bus), SCSI (Small Computer Systems Interface), Fibre Channel, Ethernet, SAS (Serial Attached SCSI), etc. The device specific circuits 401 provide additional hardware to enable the controller 400 to perform unique functions such as, but not limited to, motor control of a cartridge gripper. The device specific circuits 401 may comprise electronics that provide, by way of example but not limitation, Pulse Width Modulation (PWM) control, Analog to Digital Conversion (ADC), Digital to Analog Conversion (DAC), etc. In addition, all or part of the device specific circuits 401 may reside outside the controller 400.

While the automated data storage library 10 is described as employing a distributed control system, the described embodiments may be implemented in various automated data storage libraries regardless of control configuration, such as, but not limited to, an automated data storage library having one or more library controllers that are not distributed. A library controller may comprise one or more dedicated controllers of a prior art library. For example, there may be a primary controller and a backup controller. In addition, a library controller may comprise one or more processor nodes of a distributed control system. For example, communication processor node 50 (FIG. 3) may comprise the library controller while the other processor nodes (if present) may assist the library controller and/or may provide backup or redundant functionality. In another example, communication processor node 50 and work processor node 52 may work cooperatively to comprise the library controller while the other processor nodes (if present) may assist the library controller and/or may provide backup or redundant functionality. Still further, all of the processor nodes may comprise the library controller. Herein, library controller may comprise a single processor or controller or it may comprise multiple processors or controllers.

Figure 5:
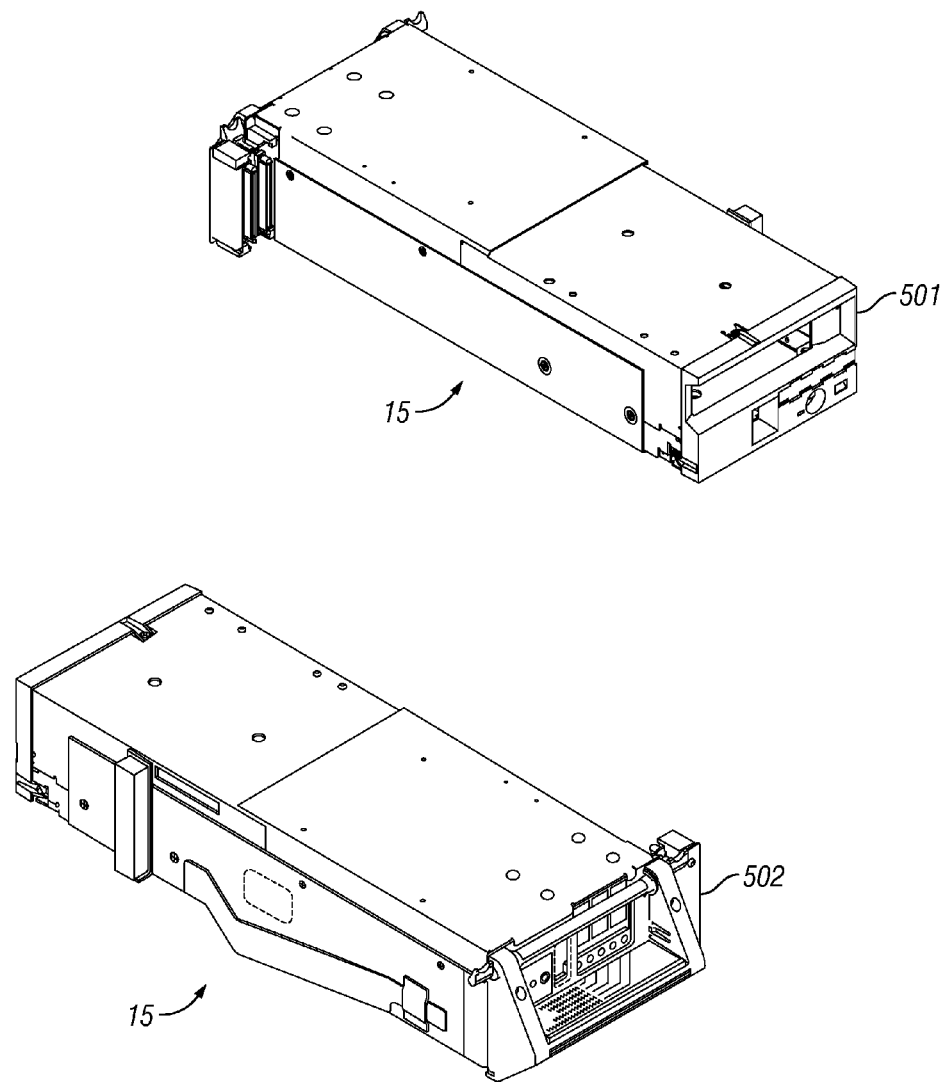
FIG. 5 illustrates a front and rear view of a data storage drive in accordance with an embodiment of the invention.

FIG. 5 illustrates an embodiment of the front 501 and rear 502 of a data storage drive 15. In the example of FIG. 5, the data storage drive 15 comprises a hot-swap drive canister. This is only an example and is not meant to limit the invention to hot-swap drive canisters. In fact, any configuration of data storage drive may be used whether or not it comprises a hot-swap canister.

Figure 6:
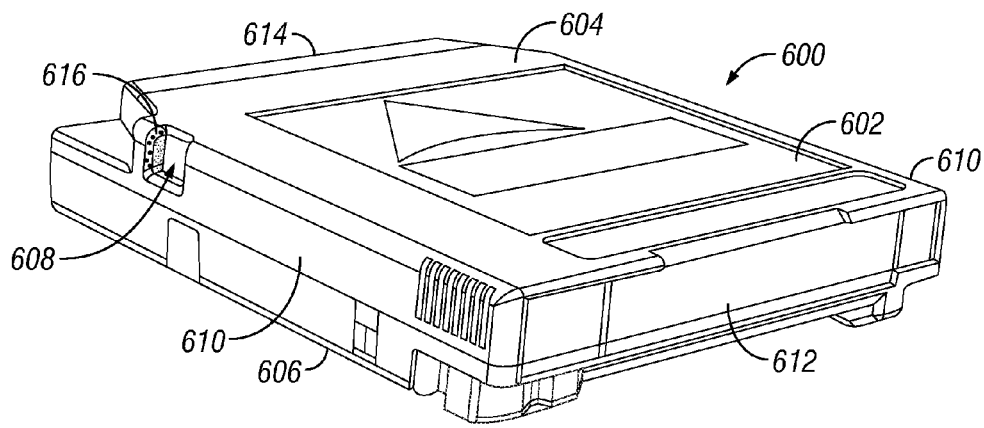
FIG. 6 illustrates a data storage cartridge in accordance with an embodiment of the invention.

FIG. 6 illustrates an embodiment of a data storage cartridge 600. Data storage cartridge 600 comprises data storage media (not shown). In one embodiment, the data storage media may be magnetic tape and, accordingly, data storage cartridge 600 may be a tape cartridge. The data storage cartridge 600 is inserted in data storage drive 15 so that the data may be read and/or written to the data storage media. As shown in FIG. 6, the data storage cartridge 600 comprises a generally rectangular housing 602 forming an exterior dimensional form factor of the data storage cartridge 600. The cartridge housing 602 has a top 604, a bottom 606, two sides 610, a front 612, and a back 614. A notch 608 is provided on the data storage cartridge 600 for engaging with a retention tab of a storage cell 16 of an automated data storage library 10. As shown, in one embodiment the notch 608 is on a one side 610 of the data storage cartridge 600. However, one of ordinary skill in the art would understand that the notch 608 could be provided at any location on the data storage cartridge 600. For example, the notch 608 could be provided either side 610 of the data storage cartridge, the top 605 or bottom 607, or the front 612 or back 614 of the data storage cartridge 600, or at a plurality of locations described above.

Figure 7:
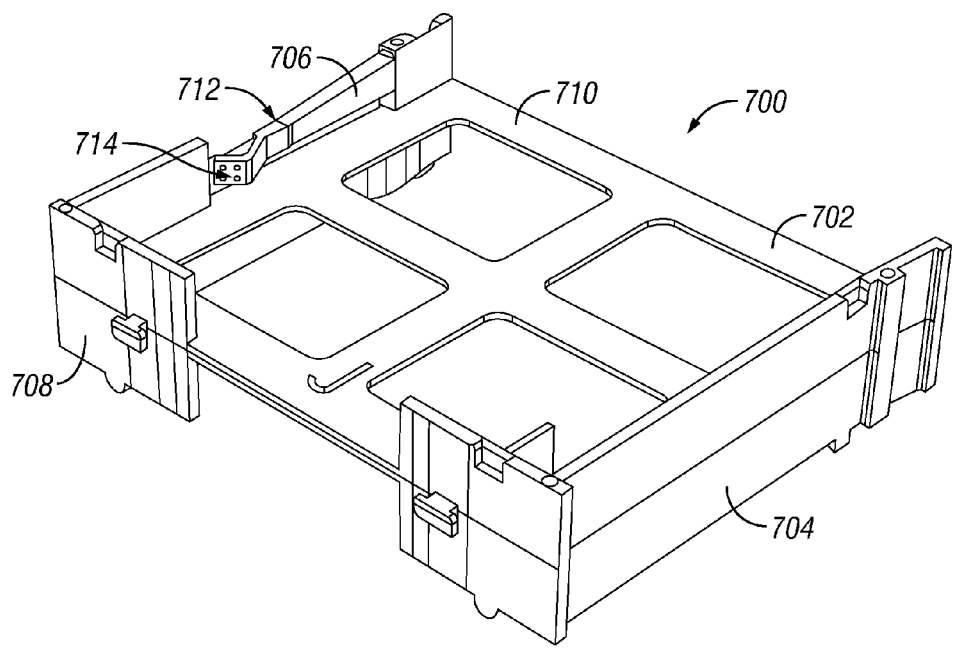
FIG. 7 illustrates a storage cell in accordance with an embodiment of the invention.
Figure 8:
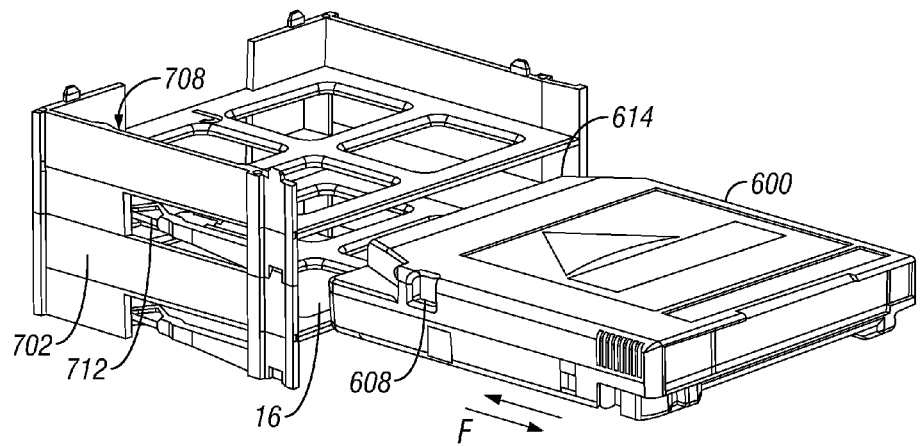
FIG. 8 illustrates the insertion and removal of a data storage cartridge from a storage cell and in accordance with and embodiment of the invention.

FIG. 7 illustrates an embodiment of a storage cell 16 comprising storage cell housing 702. The housing 702 includes a pair of opposing side walls 704, 706, a back wall 708, and a floor 710 which is orthogonal and connected to the two opposing side walls 704, 706 and the back wall 710. The side walls 704, 706, back wall 708, and floor 710 define an opening for inserting and removing data storage cartridge 600. As shown in FIG. 8, the housing 702 is modular in nature and can be stacked over another housing to form a larger array of a plurality of storage cells 16. For example, FIG. 2 illustrates a plurality of storage cells 16 on front wall 17 and rear wall 19 of an automated data storage library 10. Returning to FIG. 7, the housing 702 conforms substantially to the shape and size of a data storage cartridge 600 with tolerances that allow the easy and convenient insertion of the cartridge through the storage cell 16 opening.

The housing 702 includes a retention tab 712 for engaging the notch 608 of data storage cartridge 600 when the data storage cartridge 600 is inserted into the storage cell 16. The retention tab 712 protrudes from a side wall 706 of the housing 702 and depresses out of the path of the data storage cartridge 600 when the data storage cartridge 600 is inserted within the housing 712 and engages with the notch 608 of the data storage cartridge 600. The retention tab 712, when engaged with the notch 608 of data storage cartridge 600, retains the data storage cartridge 600 within the storage cell 16 and prevents the data storage cartridge 600 from falling out from the storage cell 16 due to outside influences such as machine vibration or opening or closing of a door to the automated storage library.

In one embodiment, the retention tab 712 includes at least one textured surface 714 that contacts the notch 608 on data storage cartridge 600 when the data storage cartridge is inserted into the storage cell 16. The textured area 714 of the retention tab 712 may include a texture of bumps, lines or grooves or any combination including at least one of bumps, lines, or grooves. The texture on textured surface 714 of retention tab 712 reduces the contact surface between the retention tab 712 and the notch 608 of the data storage cartridge 600. Accordingly the reduced contact surface between the retention tab 712 and the notch 608 of the data storage cartridge 600 reduces the amount of friction between the retention tab 712 and the notch 608 of the data storage cartridge 600 such that the data storage cartridge 600 can be removed from the storage cell 16 with less force than compared to a retention tab 712 with a non-textured surface. For example, tests have shown that providing a textured area 714 on retention tab 712 reduces the force required to pull data storage cartridge 600 from the storage cell 16 by thirty to fifty percent. Further, the textured surface 714 of the retention tab 712 allows for a more consistent force to be applied in order remove each of the data storage cartridges from their respective storage cells 16.

While FIG. 7 shows that the retention tab 712 is on a side wall 706 of the housing 702, it should be understood that the retention tab 712 could be on either side wall 704, 706 or floor 710 that corresponds with the notch 608 of the data storage cartridge 600 when inserted into the storage cell 16. Still further, while FIG. 7 shows that only area 714 of retention tab 712 includes texture, one of ordinary skill in the art would understand that the entire retention tab 712 may be textured, or that other surfaces that contact the notch 608 of data storage cartridge 600 may be textured. Finally, it should be understood that while the texture in the present embodiment is described to only include bumps, lines and grooves, one of ordinary skill in the art should understand that the texture on texture surface 714 of retention tab may be any texture that reduces the contact surface between the retention tab 712 and the notch 608 of the data storage cartridge 600.

Returning to FIG. 6, in one embodiment, the notch 608 of data storage cartridge 600 includes at least one textured surface 616. Still further, in one embodiment, the notch 608 of data storage cartridge 600 includes at least one textured surface that contacts the retention tab 712 when the data storage cartridge 600 is inserted into storage cell 16. The textured area 616 of the notch may include a texture of bumps, lines, or grooves or any combination including at least one of bumps, lines, or grooves. The texture on textured surface 616 of the notch 608 reduces the contact surface between the retention tab 712 and the notch 608 of the data storage cartridge 600. Accordingly the reduced contact surface between the retention tab 712 and the notch 608 of the data storage cartridge 600 reduces the amount of friction between the retention tab 712 and the notch 608 of the data storage cartridge 600 such that the data storage cartridge 600 can be removed from the storage cell 16 with less force than compared to a notch with a non-textured surface. For example, test have shown that providing a textured area 616 on notch 608 of the data storage cartridge 600 reduces the force required to pull data storage cartridge 600 from the storage cell 16 by thirty to fifty percent. Further, the textured surface 616 of the notch 608 of the data storage cartridge 600 allows for a more consistent force to be applied in order remove each of the data storage cartridges from their respective storage cells 16.

While FIG. 6 shows that only area 616 of notch 608 includes texture, one of ordinary skill in the art would understand that the entire notch 608 may be textured, or that other surfaces that contact the retention tab 712 of the storage cell 16 may be textured. Finally, it should be understood that while the texture in the present embodiment is described to only include bumps, lines and grooves the texture on texture surface 616 of notch 608 may be any texture that reduces the contact surface between the retention tab 712 and the notch 608 of the data storage cartridge 600.

The textured surface 616 of the notch 608 and the textured surface 714 of the retention tab 712 can be provided by any means. In one embodiment the textured surface may be molded, over-molded, roughened, or scraped, however, the invention should not be limited to these methods. Further, while the above description includes in which the either the retention tab 712 may have a textured surface 714 or the notch 608 of the data storage cartridge 600 may have a textured surface 616, one of ordinary skill in the art would understand, that in one embodiment, both the retention tab 712 and the notch 608 may have textured surfaces.

FIG. 8 illustrates an embodiment of data storage cartridge 600 is inserted and removed from the storage cell 16 of an automated data storage library 10. In one embodiment, the data storage cartridge 600 is inserted and removed from the storage cell 16 by accessor 18 with a gripper assembly 20. The accessor 18 inserts data storage cartridge 600 with the back 614 of the data cartridge housing 602 facing the back wall 708 of the storage cell housing 702. As shown in FIG. 8, the notch 608 of the data storage cartridge 600 aligns with the retention tab 712. As the accessor 18 inserts the data storage cartridge 600 in the storage cell 16 the retention tab 712 depresses out of the path of the data storage cartridge 600 and engages with the notch 608 of the data storage cartridge 600.

Figure 9:
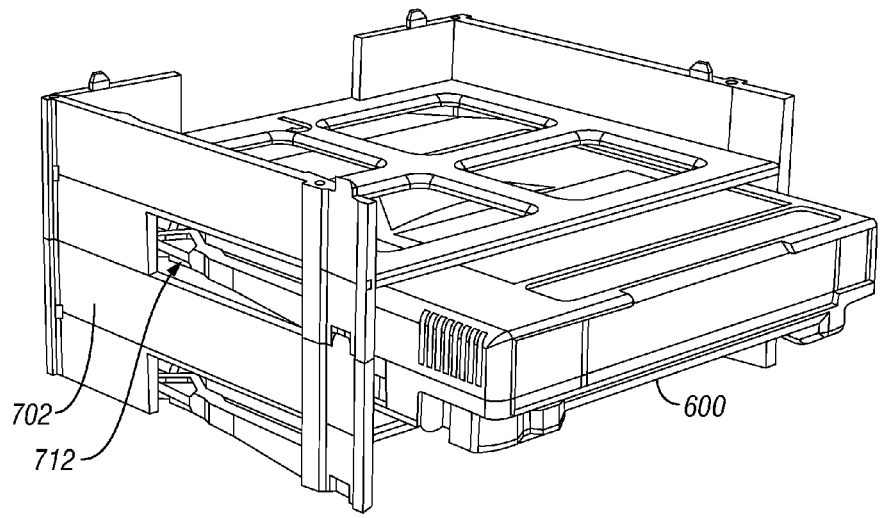
FIG. 9 illustrates a data storage cartridge inserted in a storage cell in accordance with and embodiment of the invention Features, elements, and aspects of the invention that are referenced by the same numerals in different figures represent the same, equivalent, or similar features, elements, or aspects, in accordance with one or more embodiments.

FIG. 9 illustrates data storage cartridge 600 inserted within the storage cell 16. The retention tab 712 is engaged with the notch 608 of the data storage cartridge 600. The retention tab 712 contacts the notch 608 along a textured interface. For example, area 714 of retention tab 712 may contact area 616 of notch 608 when the data cartridge is fully inserted within the storage cell 16. In one embodiment, area 714 of retention tab is textured. In another embodiment area 616 of notch 608 as textured. In yet another embodiment, both areas 714 of the retention tab and area 616 of notch 608 are textured. By providing textured areas 714 and/or 616 the contact surface between the retention tab 712 and the notch 608 of the data storage cartridge 600 is reduced. The texture of textured areas 616 and 714 may include a texture of bumps, lines or grooves or any combination including at least one of bumps, lines, or grooves. Still further, the texture may include any texture that increases the surface area of the textured areas 714 and 616 the retention tab 712 and notch 608, respectively.

Returning to FIG. 8, the accessor 18 removes the data storage cartridge 600 from the storage cell 16 by applying a force, F, in the direction indicated by FIG. 8. The reduced contact surface between the retention tab 712 and the notch 608 of the data storage cartridge 600 reduces the amount of friction between the retention tab 712 and the notch 608 of the data storage cartridge 600 such that the data storage cartridge 600 can be removed from the storage cell 16 with less force than compared to two non-textured surfaces in contact. Further, the textured surface on one of at least the notch 608 of the data storage cartridge 600 and the retention tab 712 of the storage cell allows for a more consistent force, F, to be applied to remove each of the data storage cartridges from their respective storage cells. Therefore, an accessor may be able to provide a low and consistent force to remove a plurality of data storage cartridges from their respective storage cells.

As described, embodiments of the present invention allow for a textured interface between a notch of a data storage cartridge and a retention tab of a storage cell to provide a consistent and low friction force that retains the data storage cartridge within the cell but allows the accessor to easily remove the data storage cartridge when needed. The textured surface reduces the contact surface between the retention tab and the notch of the data storage cartridge. Accordingly, the reduced contact surface between the retention tab and notch reduces the amount of friction between the retention tab and the notch. The data storage cartridge can thus be removed from the storage cell with less force than that required by the prior art having a generally smooth interface between the notch of the data storage cartridge and the retention tab of the storage cell. Further, the textured surface allows for a more consistent amount of friction between the notch and retention tab for each data storage cartridge and its respective storage cell such that a consistent amount of force can be applied by the accessor to remove each data storage cartridge from their respective storage cells.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the embodiments, the embodiments reside in the claims hereinafter appended or any subsequently-filed claims, and their equivalents.

What is claimed is:

1. A storage cell comprising: a housing for storing a data storage cartridge; an opening in said housing for inserting and removing a data storage cartridge; a retention tab within said housing for engaging with a notch of said data storage cartridge for retaining said data storage cartridge within said housing, wherein said retention tab is textured for reducing a contact surface between said retention tab and said notch.

2. The storage cell of claim 1, wherein said housing includes a pair of opposing side walls, a back wall, and a floor orthogonal and connected to said opposing side walls and said back wall, and wherein said side walls, back wall, and floor, define said opening for inserting and removing a data storage cartridge.

3. The storage cell of claim 2, wherein said retention tab protrudes from at least one side wall of said housing,
  wherein said retention tab is configured to depress out of a path of said data storage cartridge when said data storage cartridge is inserted in said housing and engage with said notch of said data storage cartridge when said data storage cartridge is fully inserted in said housing.

4. The storage cell of claim 1, wherein the texture of the said retention tab is configured to reduce a force necessary for inserting and/or removing said data storage cartridge from said storage cell.

5. The storage cell of claim 1, wherein said retention tab has at least one textured surface that contacts said notch on a side wall of said data storage cartridge when said data storage cartridge is inserted into said storage cell.

6. The storage cell of claim 1, wherein said texture of said retention tab comprises at least one of bumps, lines, and grooves.

7. The storage cell of claim 1, wherein a portion of said retention tab that is textured is positioned in the housing to contact said notch of said data storage cartridge as said data storage cartridge is inserted into said housing.

8. The storage cell of claim 1, wherein the retention tab is configured to retain said data storage cartridge within said housing by engagement with the notch of said data storage cartridge.

9. A storage cell comprising:
  a housing for storing a data storage cartridge;
  an opening in said housing for inserting and removing a data storage cartridge;
  a retention tab within said housing for engaging with a notch of said data storage cartridge for retaining said data storage cartridge within said housing,
  wherein said retention tab is textured, wherein said texture of said retention tab reduces a contact surface between said retention tab and said notch.

10. The storage cell of claim 9, wherein said reduced contact surface between said retention tab and said notch reduces an amount of force necessary for removing said data storage cartridge from said storage cell.

11. The storage cell of claim 9, wherein said housing includes a pair of opposing side walls, a back wall, and a floor orthogonal and connected to said opposing side walls and said back wall, and wherein said side walls, back wall, and floor define said opening for inserting and removing a data storage cartridge.

12. The storage cell of claim 11, wherein said retention tab protrudes from at least one side wall of said housing.

13. The storage cell of claim 12, wherein said retention tab depresses out of a path of said data storage cartridge when said data storage cartridge is inserted within said housing and engages with said notch of said data storage cartridge.

14. The storage cell of claim 9, wherein said retention tab has at least one textured surface that contacts said notch on a side wall of said data storage cartridge when said data storage cartridge is inserted into said storage cell.

15. The storage cell of claim 9, wherein said texture of said retention tab comprises at least one of bumps, lines, and grooves.

16. A storage cell comprising: a housing having a pair of opposing side walls, a back wall, and a floor, said floor orthogonal and connected to said opposing side walls and said back wall, and wherein said side walls, back wall and floor define an opening for inserting and removing a data storage cartridge; a retention tab protruding from at least one side wall for releasably engaging with a notch on a side wall of a data storage cartridge and retaining said data storage cartridge within said opening when said data storage cartridge is inserted into said storage cell; and wherein said retention tab has at least one textured surface positioned to directly contact said notch on said side wall of said data storage cartridge when said data storage cartridge is inserted into said storage cell, wherein said textured surface of said retention tab reduces a contact surface between said retention tab and said notch.

17. The storage cell of claim 16, wherein said texture of said retention tab comprises at least one of bumps, lines, and grooves configured to reduce an amount of force necessary for removing said data storage cartridge from said storage cell.

18. The storage cell of claim 16, wherein said textured surface of said retention tab contacts said notch on said side wall of said data storage cartridge as said data storage cartridge is inserted into said storage cell.

19. A storage cell comprising:
  a housing having a pair of opposing side walls, a back wall, and a floor, said floor orthogonal and connected to said opposing side walls and said back wall, and wherein said side walls, back wall and floor define an opening for inserting and removing a data storage cartridge;
  a retention tab protruding from at least one side wall for releasably engaging with a notch on a side wall of a data storage cartridge and retaining said data storage cartridge within said opening when said data storage cartridge is inserted into said storage cell; and
  wherein said retention tab has at least one textured surface that contacts said notch on said side wall of said data storage cartridge when said data storage cartridge is inserted into said storage cell,
  wherein said texture of said retention tab reduces a contact surface between said retention tab and said notch.

20. The storage cell of claim 19, wherein said reduced contact surface between said retention tab and said notch reduces an amount of force necessary for removing said data storage cartridge from said storage cell.

21. An automated data storage library for data storage cartridges comprising: an array of storage cells for storing said data storage cartridges; and wherein each storage cell comprises: a housing having a pair of opposing side walls, a back wall, and a floor, said floor orthogonal and connected to said opposing side walls and back wall, said side walls, back wall and floor defining and opening for inserting and removing said data storage cartridge from said storage cell; a retention tab protruding from at least one side wall for releasably engaging with a notch on a side wall of said data storage cartridge and retaining said data storage cartridge within said opening when said data storage cartridge is inserted into said storage cell; and wherein said retention tab has at least one textured surface that contacts said notch on said side wall of said data storage cartridge when said data storage cartridge is inserted into said storage cell, wherein said textured surface of said retention tab reduces a contact surface between said retention tab and said notch.

22. The automated data storage library of claim 21, further comprising an accessor for transporting said data storage cartridge within said storage library, wherein said textured surface of said retention tab reduces an amount of force necessary for said accessor to remove said data storage cartridge from said storage cell.

23. The automated data storage library of claim 21, wherein said textured surface of said retention tab comprises at least one of bumps, lines, and grooves.

24. The automated data storage library of claim 23, wherein said textured surface of said retention tab reduces a contact surface between said notch and said retention tab.

25. The storage cell of claim 21, wherein the retention tab is configured to retain said data storage cartridge within said housing by engagement with the notch of said data storage cartridge.

* * * * *